Aug. 28, 1928.
E. J. OLSEN
1,682,625
INFLATION DEVICE
Filed Oct. 14, 1927
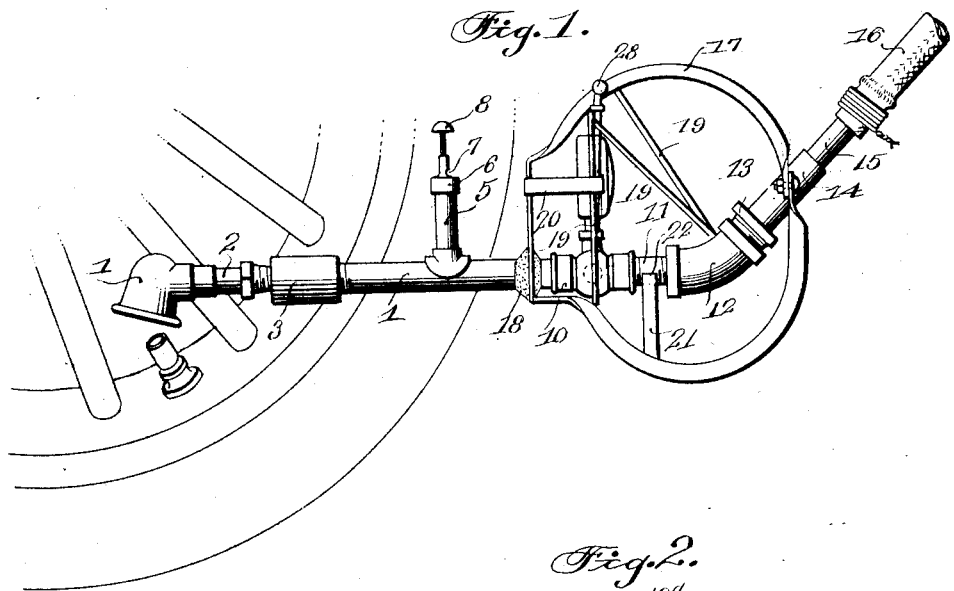
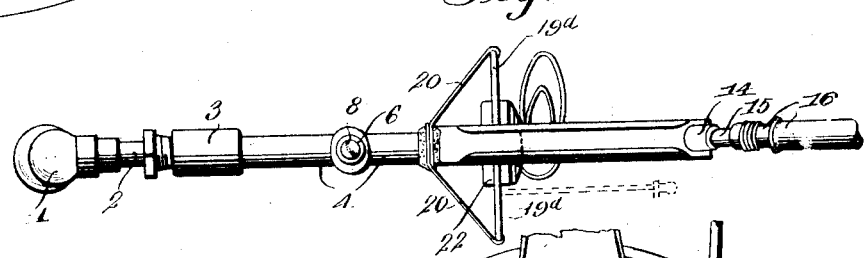
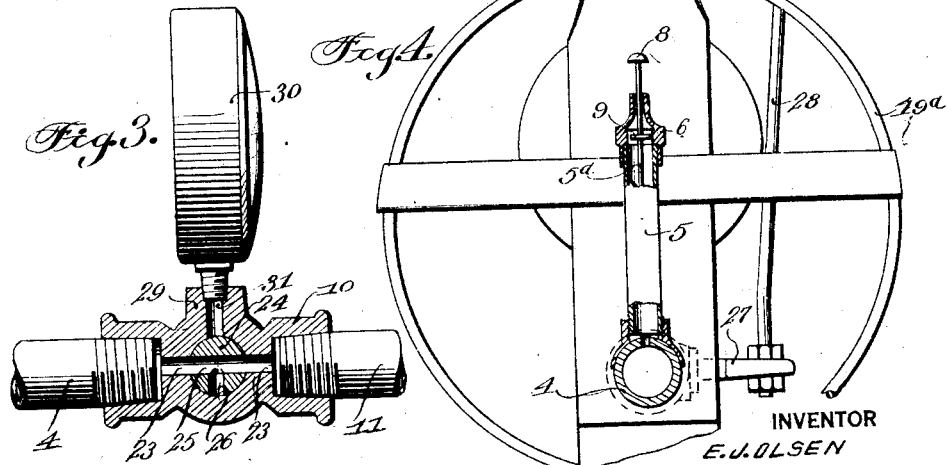
INVENTOR
E.J.OLSEN
BY
ATTORNEY Patented Aug. 28, 1928.

1,682,625

UNITED STATES PATENT OFFICE.

EMIL J. OLSEN, OF NORTH ST. PAUL, MINNESOTA, ASSIGNOR OF TWENTY-FIVE PER CENT TO WALDO OLSEN, TWENTY-FIVE PER CENT TO EMELIA OLSEN, TWENTY-FIVE PER CENT TO CORRINE OLSEN, AND TWENTY-FIVE PER CENT TO VERNON OLSEN, ALL OF NORTH ST. PAUL, MINNESOTA.

INFLATION DEVICE.

Application filed October 14, 1927. Serial No. 226,181.

My invention relates to equipment used in the inflation of articles with air under pressure, the most familiar example of which is the pneumatic automobile tire. This equipment involves the use of a compressor, a tank in which the air compressed is usually stored and a pipe or hose line, usually termed an air line, by which it is carried to a delivery head commonly known as an "air chuck", which head fits over the valve stem of the tire and opens its own valve and that in the valve stem by pressure contact permitting the air from the compressor tank to flow into the tire.

The delivery heads are subjected to hard usage and abuse, and must be sturdily constructed. The proper use of the air line in inflating tires, for example, requires that the tire be tested for air pressure before inflation thru the air line, and at intervals during inflation, and that the inflating head be removed and the tire vented when too much inflation pressure occurs. This, as previously practiced, has involved the removal of the inflating head from and its replacement on the valve stem several times while a gage has been used to test the inflated pressure and the tire valve has perhaps been vented by hand to reduce this pressure.

It has therefore been proposed to incorporate in the air line and as part of the inflating head, a pressure gauge with valve control, enabling the user to cut off the main air supply and connect the gauge with the tire under inflation, so that the attained pressure may be read. Such constructions, however, have had the disadvantage of inadequate protection for the parts, so that the gauges, for example, if not broken or destroyed are very soon inoperative, due to the rough handling which they receive.

It is one of the objects of the present invention to provide in an inflating head, a handled air control valve, a pressure gauge connected thereto, and a guard for the gauge mounted on the valve and having portions forming positioning stops for the valve handle. Inflation pressure gauges as a general rule may not be subjected to the pressures from air storage tanks or reservoirs with which the air hose is connected. Advantageously, I have associated with an air gauge as described, a two-way control valve by which air at tank pressure is prevented from entering the gauge, although the valve construction specifically provides for placing the attained inflation pressure of the tire directly in communication with said gauge and utilizies portions of the gauge-protecting guard as stops to position the valve lever in its two air-controlling positions.

These and other objects and advantages of the invention will be more clearly seen from a reading of the following specification in connection with the accompanying drawings illustrating a preferable embodiment of the invention and in which:

Figure 1 is a view in side elevation of an inflation head constructed in accordance with the present invention, and in juxtaposition to a tire to be inflated.

Figure 2 is a top plan view of said head.

Figure 3 is an enlarged detail, partly in section of the pressure gauge and its associated control valve.

Figure 4 is a vertical sectional view taken on the line 4—4 of Figure 1, looking toward and showing in elevation the inflation gauge with its guard frame and valve operating rod.

Referring to the drawings by numerals, the chuck head or nozzle 1, forming one terminal of the inflation head is of conventional design and construction joined to the coupling 3 by its threaded nipple 2. Piping 4 extends from the opposite end of the coupling 3 to one end of a tubular valve casing 10 to the opposite end of which a continuing length of pipe 11 is threaded and is extended by elbow 12 and nipple 13 and reducing coupling 14 to a terminal 15 to which the end of the usual flexible air hose 16 may be appropriately connected as by the usual wire.

From a point forwardly of the tubular valve 10, rearwardly to a point which may appropriately be represented by the reduction tube 14, a broad metal band 17 encircles and incloses the tubing and air gauge, this band being in the form preferably of a yoke or loop, the ends of which may be suitably secured together and the band being perforated to fit over the tubing sections 11 and 14. It may be soldered thereto as at 18 to make the connection permanent. The edge of the broad band 17 is preferably rolled for a greater portion of its extent to facilitate handling and prevent injury from its sharp edges. This yoke will protect the gauge from injury by movement in one direction, but I prefer to further guard it from injury by a plurality of looped wires 19 connecting the yoke 17 at opposite sides and also bracing the yoke to the inclosed line of air tubing. The foremost guard wire ring 19ª is braced to the yoke 17 by the metal strip 20. This wire extends in a substantially vertical plane viewed in the position shown in Figure 1, and acts as a stop for the operating lever of the air control valve to position the valve for tire inflation as will now be described. An angle brace 21 connects the lower end of the yoke with the tubing section 11, and presents a horizontal face 22, Figures 1 and 2, against which the valve operating lever abuts and is positioned in a second air controlling position which, in the construction shown, places the inflated tire in communication with the pressure gauge.

This air control valve is mounted in the tubular valve casing 10 between its ends, and with its axis extending transversely through the axis of the air passage 23, which extends longitudinally through the valve casing 10 and merges with the ends of the tubing sections 4 and 11. This valve 24 is of the plug type and has a transverse centrally located air passage 25 alining with the casing passage 23 at each edge and a communicating by-pass 26 extending substantially perpendicular thereto. To its projecting operating stem 27, (Figure 4) resembling the finger piece of the familiar gas valve key, is connected the lower end of an operating rod or lever 28 extending vertically upward, as seen in Figures 1 and 4. This lever 28 is positioned in line with the horizontal base 22 of the brace 21, and lies within the circle of the guard wire ring 19ª so that in its upright position, it abuts against and is stopped by this ring. In this position, the valve 20 alines its transverse air passages 25 with the tank and tire connecting passage 23 of the tank casing transmitting the air at tank-pressure to the tire for inflation purposes. If the valve lever is now moved downwardly from the position shown in Figure 1 through an 90° arc or quarter turn, until it rests against the positioning stop afforded by the horizontal face 22 of the angled brace 21, the transverse passages 25 of the valve will receive a 90° turn cutting off the air tank. The valve casing 10 is formed centrally with an upstanding boss 29 internally threaded to receive the nipple of the inflation gauge 30 which is conventionally shown and which may be of any suitable construction, preferably including a resetting plunger as usual. The vertical passage 31 downwardly from the gauge connection and in the position of the part shown in Figure 3 is alined with the by-pass 26 in the valve 24. Therefore, when the valve operating lever 28 is moved downwardly through the quarter turn as above described, not only will the tank be cut off from the nozzle, but the tire, through the alinement of the by-pass 26 with the adjacent side of the passage 23 and tube section 14 and the vertical alinement of the valve passage 25 with the casing passage 31 and gauge 30, will be directly connected with the gauge so that when the nozzle is depressed as in inflating, the pressure attained by inflation at the time the lever 20 is moved downwardly, will be recorded by the air gauge 30. It is to be noted in this connection, that the valve 24 in the position transmitting air under pressure from the tank to the tire for inflation purposes, cuts off the inflation gauge from the tank air pressure so that the gauge is not subjected to the strain imparted by the much higher pressures of the air storage tank. Inflation gauges are not made to withstand the much higher pressures of storage tanks, and consequently are affected in their accuracy by being subjected to such pressure.

Between the gauge guard frame and the nozzle 1, and at a point intermediate the ends of the pipe section 4, I interpose, what may be termed, a bleed valve of novel construction which, as previously described, is used to reduce the attained pressure of the inflated tire when this has reached a point beyond that desired. This valve is conveniently formed by utilizing a valve 5 corresponding in construction to the standard form of inner tube valve with which the nozzles 1 are intended to cooperate. Such a valve 5 with its base is suitably secured to the tubing section 4 as by solder, welding, etc. the tube in line with the valve being appropriately drilled as seen in Figure 4. The familiar valve cap 6 has its stem at one side cut away as at 7 to form an air escape opening and a plunger 8 is loosely guided through the drilled end of the cap and provided at its base with an abutment head 9 intended to be placed against the upper end 5ª of the valve stem to open the tire valve and release the air therefrom. By depressing the head of the stem 8, when the tank pressure has been cut off and the gauge 30 indicates an attained pressure higher than is desired, the operator may "bleed" the tire of air until the gauge indicates that the pressure has been lowered to the desired point.

The entire operation of inflating the tire, gauging the attained pressure and reducing the attained pressure when necessary is performed while the nozzle 1 remains on the valve stem and by the use of a control device within easy reach of the operator without necessitating the removal of the operator's hand from the nozzle 1, assuming the latter is of the type not provided with automatic stem gripping means.

From the foregoing, it will be evident that the inflation device described herein presents a construction providing adequately guarded pressure gauging means and conveniently located pressure controlling means by which all operations connected with inflation and deflation of the inner tubes of a tire or other object to be inflated may be performed and gauged without removing the head from the valve stem of the object to be inflated. The construction described while preferable, is intended as illustrative and not restrictive. It will be evident that the illustrated structure is subject to adaptation and change within the spirit of the invention and the scope of the appended claims.

What I claim and desire to secure by Letters Patent is:

1. An inflating head for air line terminals comprising a length of tubing having an air chuck at one end and an air line connection at the other, an inflation pressure gauge, an air control valve interposed in said tubing mounting and having valved communication with said pressure gauge, said valve having an operating handle and a guard protecting said gauge mounted on said tubing and having portions positioned for engagement by said valve handle in different positions of adjustment of the valve.

2. An inflating head for air line terminals comprising a length of tubing having an air chuck at one end and an air line connection at the other, an air control valve incorporated in said tubing and having an operating lever, an inflation pressure gauge mounted on and in valved connection with said control valve and a guard attached to said tubing protecting said gauge at the sides, front and rear, said guard being formed to provide an abutment cooperating with the valve lever to position the valve in a determinate air controlling position.

3. An inflating head for air line terminals comprising tubing having an air chuck at one end and an air line connection at the other, a two-way air control valve incorporated in said tubing and having an operating lever, a pressure gauge mounted on and in valved connection with said control valve, and a protective caging inclosing said gauge and anchored to said tubing, said caging having spaced abutment portions alined with said valve lever to engage and stop said lever in its two positions of air control.

4. An inflating head for air line terminals comprising tubing having an air chuck at one end, an air line connection at the other end and an intermediately positioned two-way valve incorporated in said tubing and having a cooperating pressure gauge upstanding therefrom a valve operating lever, and a guard mounted on said tubing and protecting said gauge, the guard being formed with portions lying in the path of movement of the valve lever and positioned to arrest movement of the lever and position the valve to connect air line and tire, and gauge and tire, respectively.

5. An inflating head for air line terminals comprising a length of tubing having an air chuck at one end and an air line connection at the other, with a two-way valve interposed in said tubing and mounting an air pressure gauge, an operating handle for said valve, and a guard affixed to the tubing and protecting said gauge, the guard being formed with spaced portions positioned to aline with the valve handle to stop said handle in its two pressure transmitting positions.

6. An inflating head for air line terminals comprising tubing having an air chuck at one end, an air line connection at the other end and an intermediately positioned two-way valve mounting a cooperating pressure gauge and a valve operating lever, and a gauge protective caging affixed to the tubing and surrounding said gauge, said caging having spaced portions traversing the line of movement of the valve operating lever and forming spaced stops to position the valve lever in determinate valve positioning relation.

Signed at North St. Paul, in the county of Ramsey and State of Minn., this 10 day of October, A. D. 1927.

EMIL J. OLSEN.